(12) United States Patent
Chang et al.

(10) Patent No.: US 7,299,288 B2
(45) Date of Patent: *Nov. 20, 2007

(54) SYSTEM AND METHOD FOR CONCURRENT SECURITY CONNECTIONS

(75) Inventors: David Yu Chang, Austin, TX (US); Derek Wan Hok Ho, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/274,229

(22) Filed: Nov. 15, 2005

(65) Prior Publication Data

US 2006/0080445 A1    Apr. 13, 2006

Related U.S. Application Data

(63) Continuation of application No. 10/042,495, filed on Jan. 9, 2002, now Pat. No. 6,996,620.

(51) Int. Cl.
*G06F 13/00*    (2006.01)
(52) U.S. Cl. ..................... 709/229; 709/219; 709/225

(58) Field of Classification Search ............... 709/217, 709/219, 223, 225, 227, 229, 250
See application file for complete search history.

(56) References Cited

U.S. PATENT DOCUMENTS

| | | | | |
|---|---|---|---|---|
| 5,812,784 | A * | 9/1998 | Watson et al. | 709/227 |
| 5,928,363 | A * | 7/1999 | Ruvolo | 726/22 |
| 6,044,465 | A * | 3/2000 | Dutcher et al. | 726/13 |
| 6,199,077 | B1 * | 3/2001 | Inala et al. | 715/501.1 |
| 6,470,453 | B1 * | 10/2002 | Vilhuber | 726/4 |
| 6,928,469 | B1 * | 8/2005 | Duursma et al. | 709/223 |
| 7,039,714 | B1 * | 5/2006 | Blakley III et al. | 709/229 |
| 7,058,798 | B1 * | 6/2006 | Elley et al. | 726/30 |
| 2003/0055990 | A1 * | 3/2003 | Cheline et al. | 709/229 |

* cited by examiner

*Primary Examiner*—Viet D. Vu
(74) *Attorney, Agent, or Firm*—VanLeeuwen & VanLeeuwen; David A. Mims, Jr.

(57) ABSTRACT

A system and method for concurrent security connections is presented. An association table is used that includes a list of active credentials. An active credential includes information such as user id and password information for a given domain. The active credential may also include dynamic data that is retrieved from a user, such as a pseudo-random code or a fingerprint scan. The active credential is sent to a domain, or the managing server of the domain, when domain access is requested. This access request does not involve the user of the client unless dynamic input data is requested.

15 Claims, 6 Drawing Sheets

SYSTEM AND METHOD FOR CONCURRENT SECURITY CONNECTIONS

RELATED APPLICATIONS

This application is a continuation of application Ser. No. 10/042,495 filed on Jan. 9, 2002, and issued as U.S. Pat. No. 6,996,620 on Feb. 7, 2006.

BACKGROUND OF THE INVENTION

1. Technical Field

The present invention relates in general to a method and system for multiple login contexts. More particularly, the present invention relates to a system and method for enabling concurrent security connections in a heterogeneous network.

2. Description of the Related Art

A user may access different networks to retrieve and send information based upon the task at hand. The user may access different networks within his company, especially if the company is large and covers multiple geographic areas. Even though the company may strive to have similar networks throughout the individual business areas, this may be difficult to accomplish in cases where a company purchases another company and attempts to integrate the two networks. The user may also access networks external to his company. For example, an engineer may be designing a system using a vendor's device. The engineer may access proprietary technical notes that are located on the vendor's network through a Virtual Private Network (VPN) or other secure network.

A network may have varying degrees of logon complexity based on the security needs of the network. For example, a network that includes highly sensitive information may have a very complex login requirement which may include the use of biometric inputs and the use of dynamic encryption cards that synchronize random numbers with login servers at various points in time. A second network in the same company that does not include sensitive information may have a very simple login requirement, such as simply entering a user id and password. Each network may also have specific login security requirements. For example, one network may have a password requirement length of five alpha characters and another network may have a password requirement of eight characters in which two of them are numeric.

Networks may require a dynamic login method for user's logging in from a remote location in order to have an additional level of security. For example, the network may require that the user enter a number based on a pseudo-random code that changes numbers at specific time intervals, such as with an ACE™ card. The probability that a user encounters a unique logon requirement increases when the user accesses external networks. As mentioned before, some networks may require the contemporaneous entry of biometric information, such as the user's fingerprint or retina scan.

A challenge found in the current art is securely managing the different user id's and different passwords a user configures to access multiple networks. The user may not want to write down his user id's and passwords for security risk reasons. Logging on to many different networks during the workday is also time consuming and cumbersome. While a user may store login information in a secure place, such as an encrypted file on the user's computer, the repeated retrieval and maintenance of the information is troublesome.

However, login security requirements are essential and may not be avoided. Login security requirements protect the network from malicious clients wanting to compromise or disrupt the network. What is needed, therefore, is a way to ensure a level of network security while providing a convenient means for client login in a heterogeneous network.

SUMMARY

It has been discovered that by using a table of active credentials associated with various domains, clients may concurrently login to different security domains and conveniently maintain multiple associations with multiple servers.

A client maintains an association table that includes a list of active credentials. An active credential includes information such as user id and password information relating to a given domain. Each active credential corresponds to a domain that the client accesses. When the client requests access to a network resource or a domain, the client's computer system retrieves the corresponding active credential from the association table and sends it to a server that manages the requested domain. The server verifies the login information, and grants access for the requested network resource or a domain to the client.

A client may request access to a network resource or a domain that does not have an existing active credential stored in the association table. An active credential manager monitors the login exchanges between the client and the server that manages the requested domain. The active credential manager creates a new active credential associated with the requested domain and stores the login exchange information in the new active credential for future access requests.

Some situations may require the user to enter a dynamic data input for increased security reasons. For example, a user may log in to a domain from a remote location and the user may need to use an ACE™ card that shows a changing pseudo-random code. The active credential associated with this configuration includes a dynamic data description that specifies the user interface requirements in order to obtain the dynamic data during the log on sequence.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
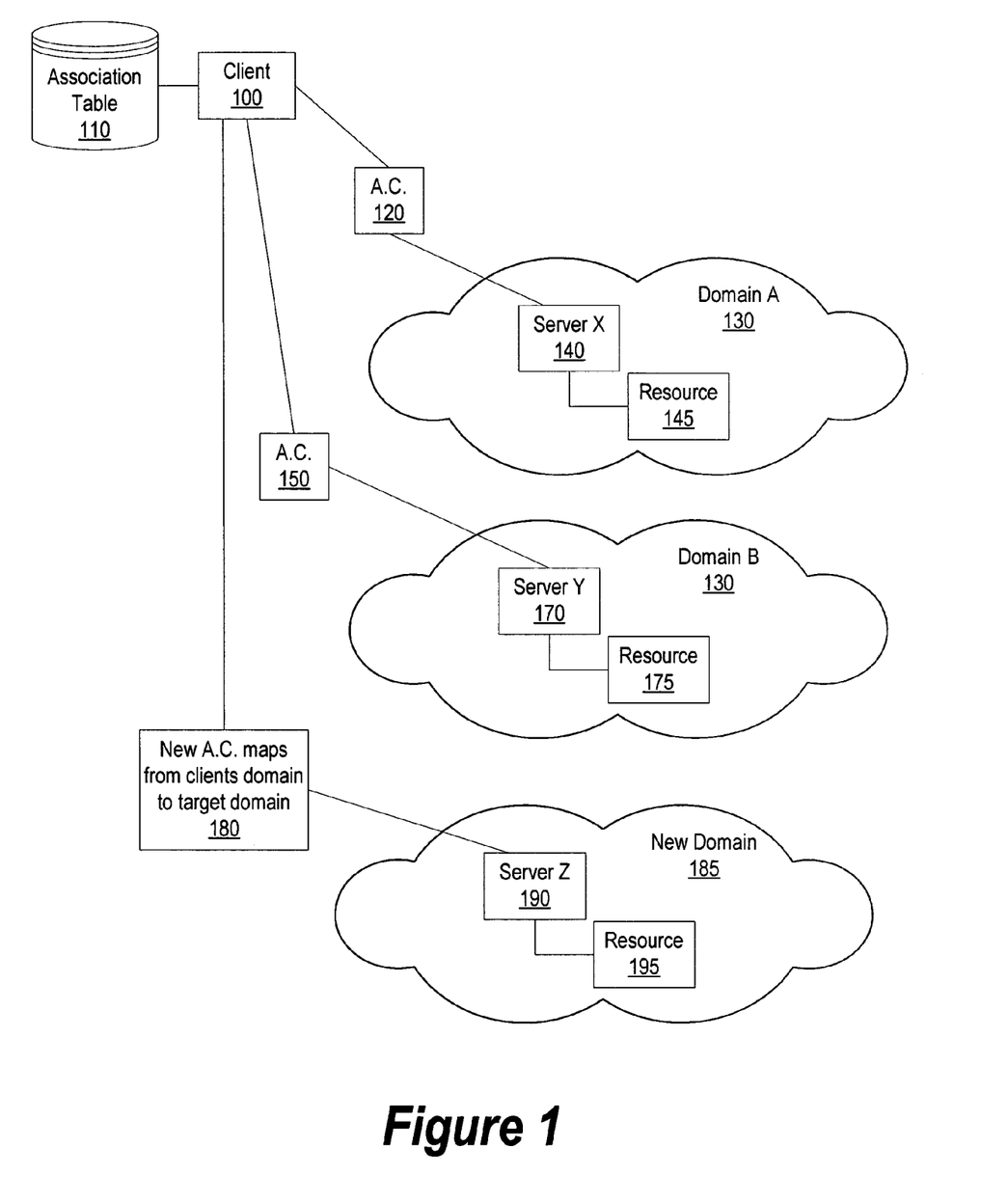
FIG. 1 is a diagram of a client accessing multiple resources.

FIG. 1 is a diagram of a client accessing multiple resources. Client 100 accesses resource 145, resource 175, and resource 195 within domain A 130, domain B 160, and new domain 185, respectively. Client 100 has active credentials corresponding to Domain A 130 and Domain B 160 stored in association table 110. For example, resource 145 may be a printer that client 100 frequently accesses and resource 175 may be a time card system that client 100 accesses weekly. Association table 110 is located in a non-volatile storage area, such as a computer hard drive, accessible by the client.

Client 100 requests access to resource 145 that is within domain A 130. Client 100 retrieves an applicable active credential from association table 110 that corresponds to domain A 130. Client 100 sends active credential 120 to server X 140 which manages domain A 130. Server X 140 grants access for Domain A to client 100 and client 100 accesses resource 145.

Server X 140 may allow access of domain A 130 to client 100 for a specific period of time, or may require client 100 to send authorization information each time client 100 access resource 145. For example, resource 145 may be a printer that client 100 accesses many times during a day. Client 100 sends active credential 120 to server X 140 each time client 100 requests to print a document. The user of client 100 may not be bothered with sending authorization information since the authorization information is included in active credential 120.

Client 100 requests access to resource 175 that is within domain B 130. Client 100 retrieves an applicable active credential from association table 110 that corresponds to domain B 160. Client 100 sends active credential 150 to server Y 170 which manages domain B 160. Server Y 170 grants access for Domain B to client 100 and client 100 accesses resource 175. Server Y 170 may allow access of domain B 160 to client 100 for a specific period of time, or may require client 100 to send authorization information each time client 100 access resource 175. For example, resource 175 may be a timecard system that the user of client 100 accesses once a week to enter the amount of hours the user worked during the week. Client 100 sends active credential 150 to server 170 each time the user of client 100 requests to enter timecard information. The user of client 100 may not be bothered with sending authorization information since the authorization information is included in active credential 150.

In another embodiment, client 100 may be accessing domain B 160 from a remote location. Domain B may require a higher level of security for remote clients. An ACE™ card may be used that provides a changing pseudo-random code that a user may enter into active credential 150. In addition to the other authorization information sent within active credential 150, server Y 170 verifies that the pseudo-random code matches a pseudo-random code maintained by server Y 170 that corresponds to the client's userid. After authorization is complete, server Y 170 grants access to client 100.

Client 100 requests access to resource 195. Client 100 accesses association table 110 and determines that an active credential is not defined that corresponds to new domain 185. For example, domain 185 may be a vendor's domain and resource 195 includes technical notes of a device that the vendor manufactures. Client 100 contacts Server Z 190 which manages new domain 185 and requests access to new domain 185. Client 100 defines new active credential 180 through a login process with Server Z 195 and stores information corresponding to new active credential 180 in association table 110 for future access requests to new domain 185.

Figure 2:
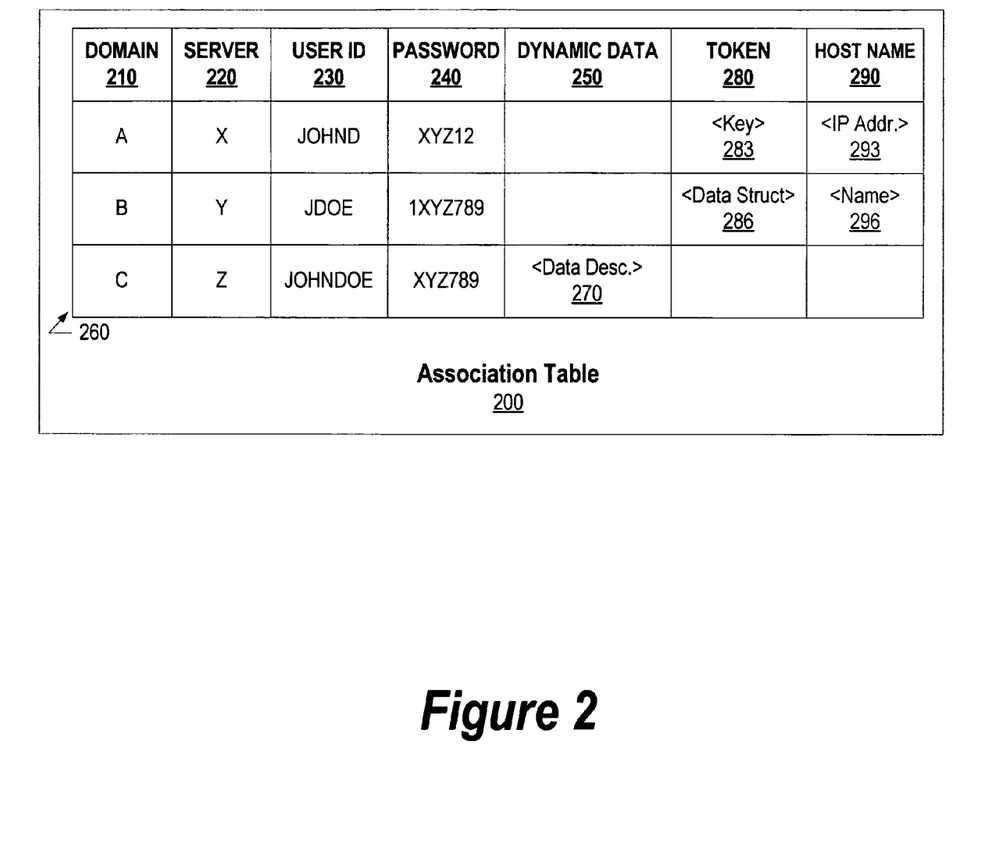
FIG. 2 is an association table that includes a plurality of active credentials.

FIG. 2 is an association table that includes a number of active credentials. Association table 200 includes various fields that are used to allow a client access to various resources. Domain field 210 includes information about the domain that corresponds to a given resource. For example, domain field 210 shows domain A, domain B, and domain C are registered in association table 200. Server field 220 includes information about a server that controls the corresponding domain. For example, server X, server Y, and server Z correspond to domain A, domain B, and domain C, respectively.

User id field 230 includes an applicable user id that allows the client to access the corresponding server. For example, JOHND, JDOE, and JOHNDOE are the user id's that correspond to server X, server Y, and server Z, respectively. Password field 240 includes an applicable password that corresponds to the user id in the same active credential. For example, XYZ12, 1XYZ789, and XYZ789 correspond to user id's JOHND, JDOE, and JOHNDOE, respectively.

Dynamic data field 250 includes information about dynamic information required for a given active credential. For example, active credential 260 requires users to enter dynamic data information corresponding to dynamic data description 270. Data description 270 may inform the user to enter a pseudo-random code on his ACE™ card in order to access domain C.

Token field 280 includes additional security information, such as key 283 and security data structure 286. Key 283 may include a shared private key or a public key/private key (i.e., a private key used to authenticate the client with a message deciphered by a server using the client's public key, or a public key corresponding to the server that is used to authenticate the server).

Host name field 290 can include an address of a host computer system. Examples of host computer system addresses include IP address 293 and string name 296 which each identify a host computer by an address. The host name can be used for delegation whereby a server computer system uses association table 200 in order to act on behalf of a client computer system (i.e., the client computer system delegates the server to perform certain actions that require the server to access one or more computer resources for which client authentication information is required).

Figure 3:
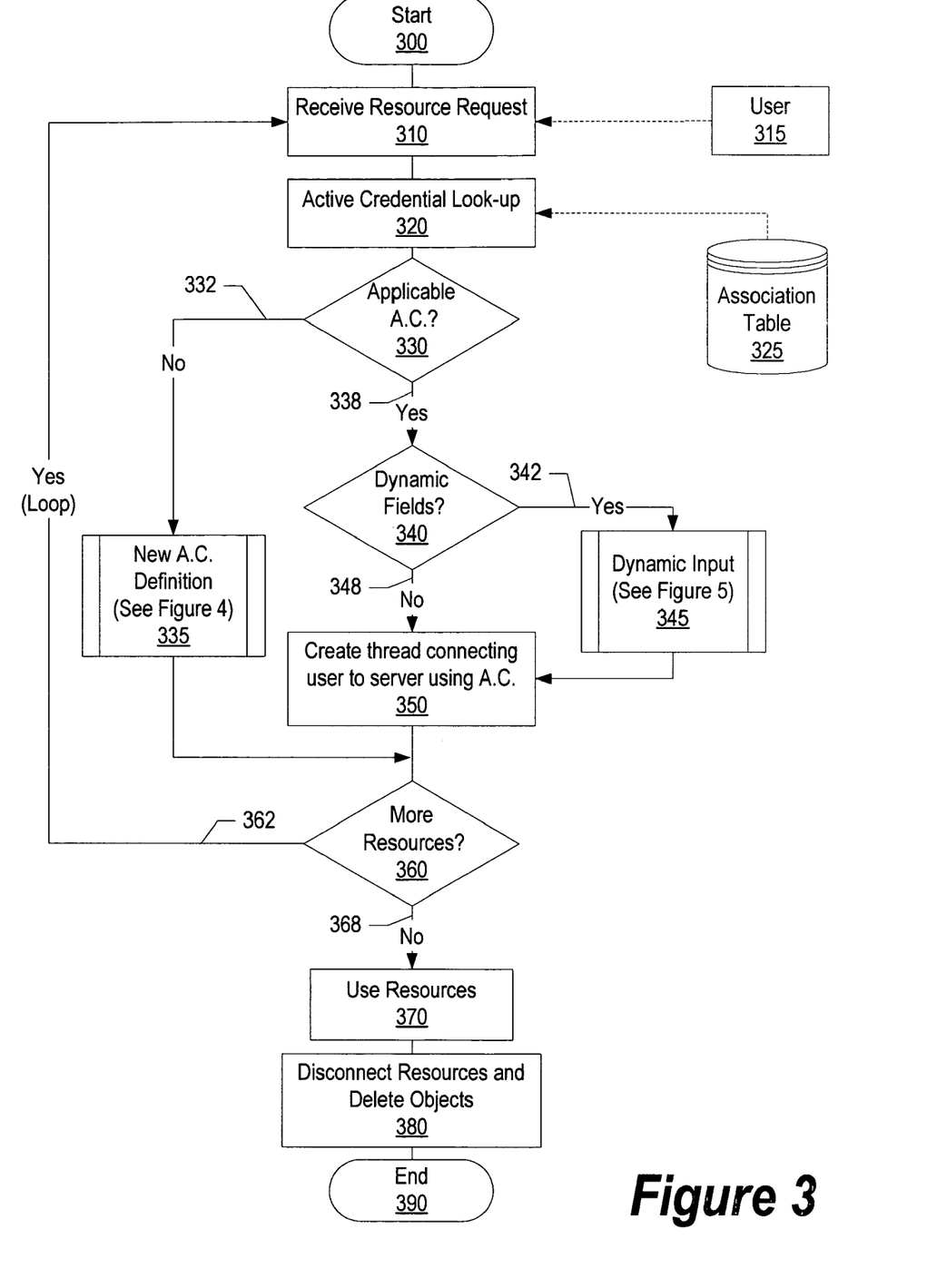
FIG. 3 is a flowchart showing active credentials enabling resource connections.

FIG. 3 is a flowchart showing resources being accessed using active credentials. Processing commences at 300, whereupon a resource request is received from user 315 (step 310). Association table 325 is searched to find an active credential that matches the requested resource (step 320). A determination is made as to whether an active credential is retrieved that is applicable to the requested resource (decision 330). If the active credential is not applicable, decision 330 branches to "No" branch 332 whereupon a new active credential is defined (pre-defined process block 335, see FIG. 4 for further details). On the other hand, if the active credential is applicable, decision 330 branches to "Yes" branch 338 whereupon a determination is made as to whether the active credential has dynamic field requirements (decision 340).

If the active credential has dynamic field requirements, decision 340 branches to "Yes" branch 342 whereupon the dynamic field is processed (pre-defined process block 345, see FIG. 5 for further details). On the other hand, if the active credential does not have dynamic field requirements, decision 340 branches to "No" branch 348 bypassing the dynamic input processing. After the security information has been gathered, a thread is created using the active credential that connects the user to the requested resource using the retrieved security information (step 350).

A determination is made as to whether the user requests more resources (decision 360). If the user requests more resources, decision 360 branches to "Yes" branch 362 which loops back to receive another resource request. This looping continues until there are no more resource requests, at which point decision 360 branches to "No" branch 368. The resources are used at step 370. When the resources are no longer used, the resources are disconnected from the client's computer system at step 380, and processing ends at step 390.

Figure 4:
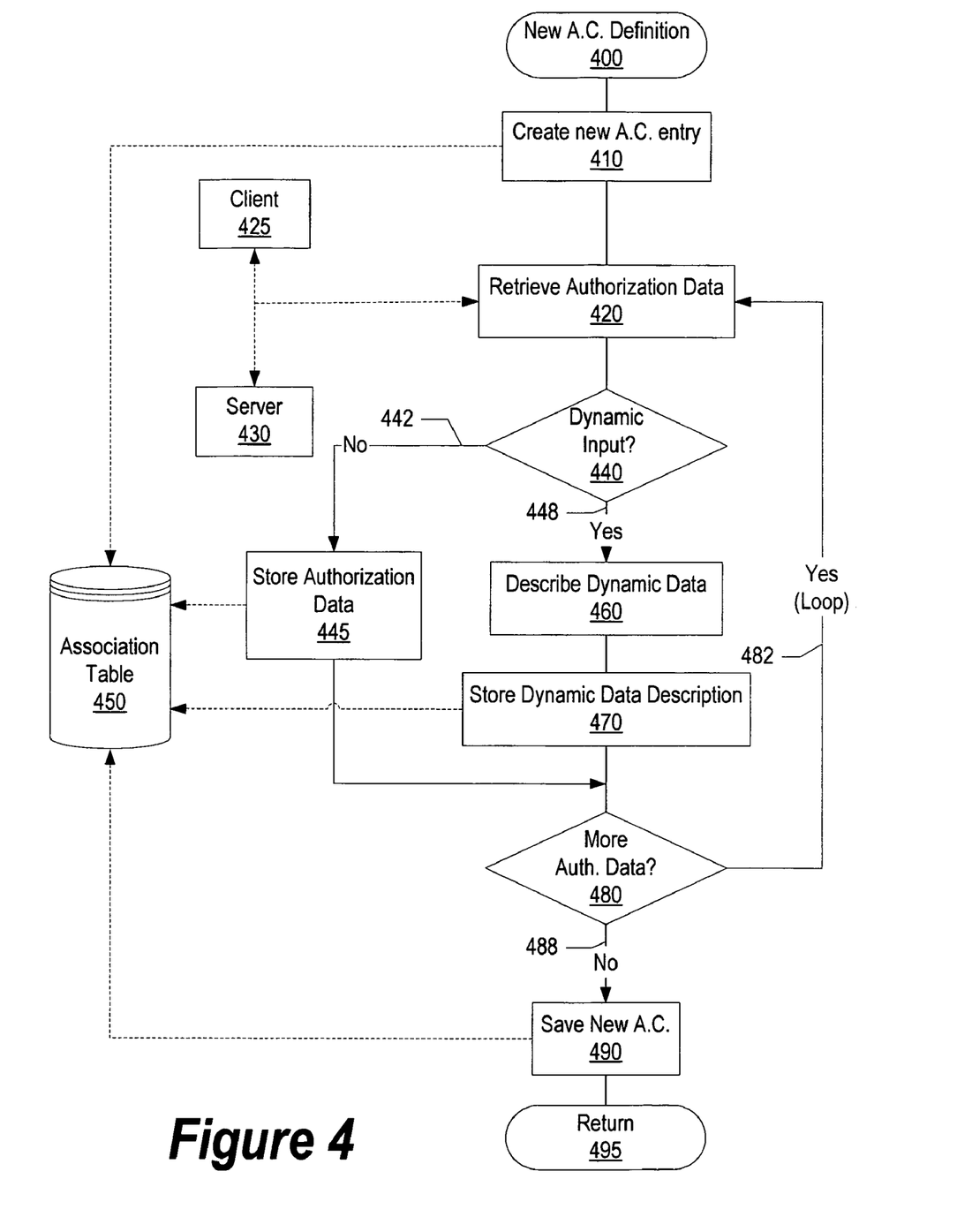
FIG. 4 is a flowchart showing a new active credential being created.
Figure 5:
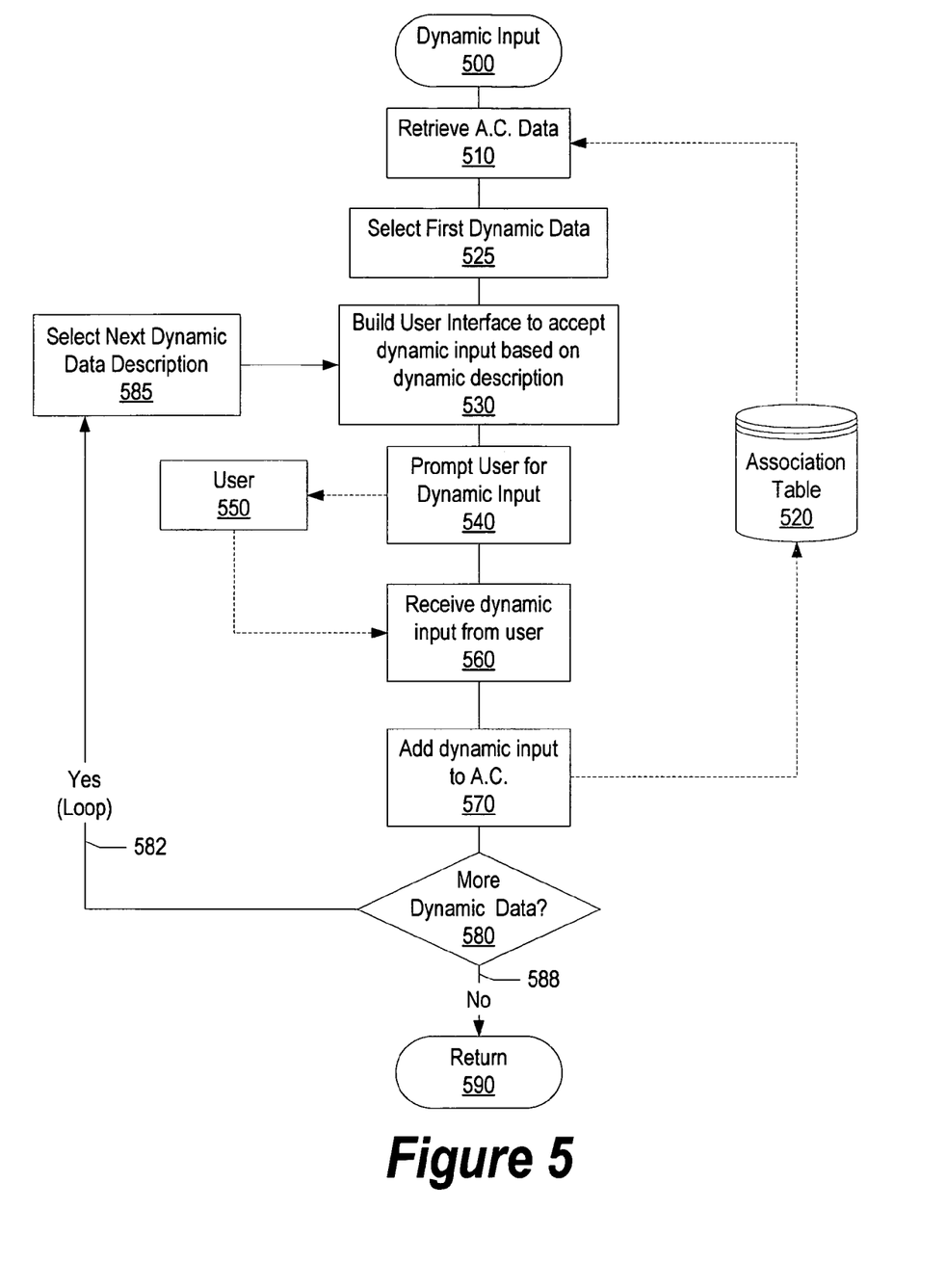
FIG. 5 is a flowchart showing dynamic input being received and stored corresponding to an active credential.

FIG. 4 is a flowchart showing a new active credential being created. Processing commences at 400, whereupon a new active credential entry is created in association table 450. Authorization data is retrieved during an authorization session between client 425 and server 430 (step 420). Authorization data may include a user id, a password, a server name, etc.

A determination is made as to whether the retrieved authorization data includes dynamic data. For example, the retrieved authorization data may request that the user enter a pseudo-random code or a biometric signature, such as a finger print scan. If the authorization data does not include dynamic data, decision 440 branches to "No" branch 442 whereupon the retrieved authorization data is stored in the corresponding active credential located within association table 450 (step 445). On the other hand, if the authorization data is dynamic, decision 440 branches to "Yes" branch 448 whereupon the dynamic data is described (step 460). For example, the dynamic data description may include the properties for a user interface to prompt the user for dynamic data, such as a pseudo-random code or a finger print scan. The dynamic data description is stored in association table 450 at step 470.

A determination is made as to whether there is more authorization data to retrieve (decision 480). If there is more authorization data, decision 480 branches to "Yes" branch 482 which loops back to retrieve more authorization data. On the other hand, if there is not more authorization data, decision 480 branches to "No" branch 488 whereupon the new active credential is stored in association table 450 (step 490), and processing returns at 495.

FIG. 5 is a flowchart showing dynamic input being received and stored with an active credential. Dynamic input processing commences at 500, whereupon the active credential associated with a resource request is retrieved from association table 520 (step 510). A user interface is constructed corresponding to the type of dynamic input required (step 530). For example, the user interface may ask the user to enter a pseudo-random code that is shown on his personalized ACE™ card. Biometric technology may also be used whereby the user interface may request the user to place his thumb on a thumb print scanner.

Processing prompts user 550 for the dynamic input at step 540. The dynamic input is received from user 550 (step 560), and is stored in an active credential that is associated with the requested resource (step 570). Using the example above, the thumbprint scanner digitizes the user's thumbprint and stores the digitized sample in the corresponding active credential.

A determination is made as to whether there is more dynamic data to corresponding to the active credential (decision 580). If there is more dynamic data to describe, decision 580 branches to "Yes" branch 582 which loops back to select the next dynamic data description (step 585). This looping continues until there is no more dynamic data to describe, at which point decision 580 branches to "No" branch 588. Processing returns at 590.

Figure 6:
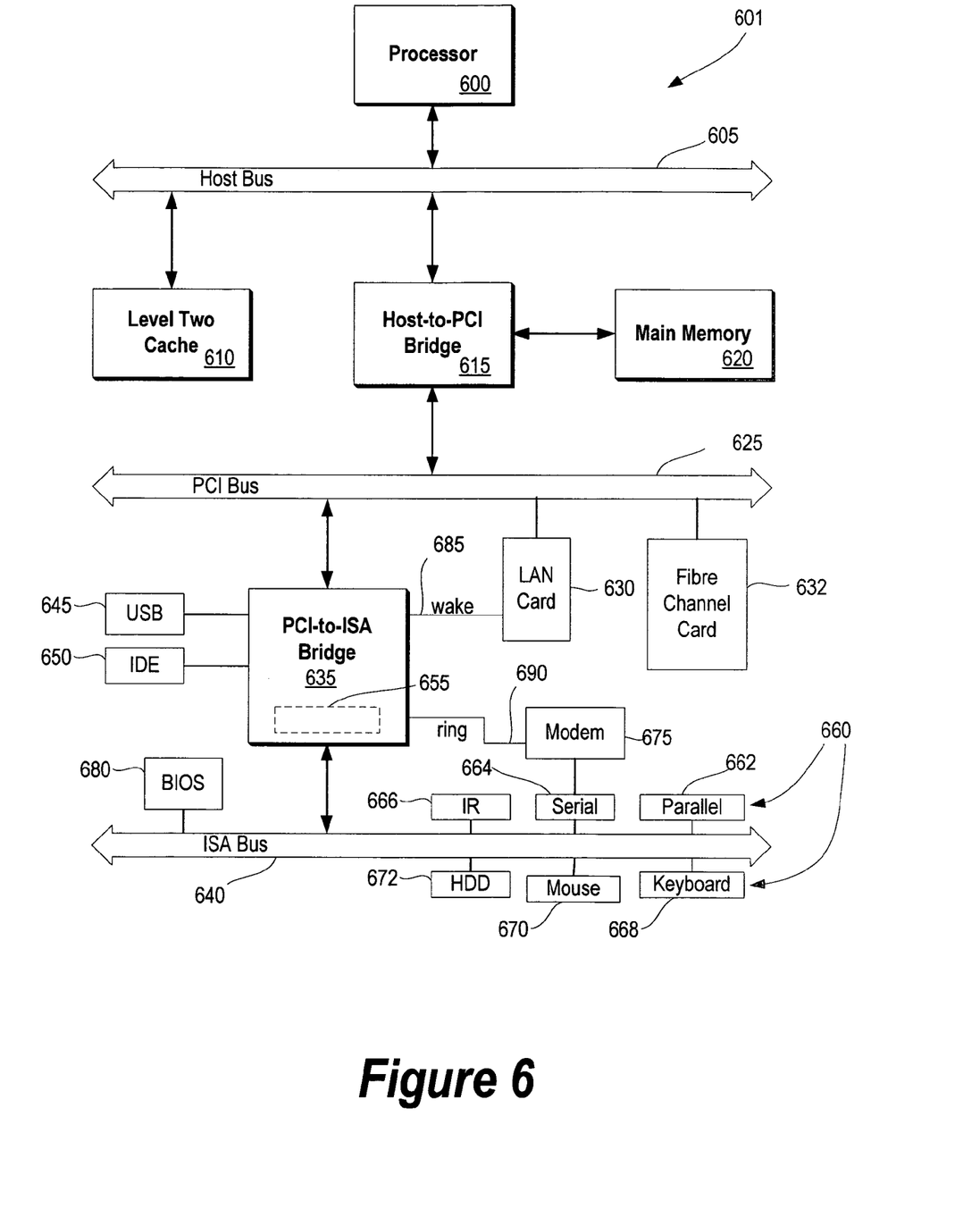
FIG. 6 is a block diagram of an information handling system capable of implementing the present invention.

FIG. 6 illustrates information handling system 601 which is a simplified example of a computer system capable of performing the server and client operations described herein. Computer system 601 includes processor 600 which is coupled to host bus 605. A level two (L2) cache memory 610 is also coupled to the host bus 605. Host-to-PCI bridge 615 is coupled to main memory 620, includes cache memory and main memory control functions, and provides bus control to handle transfers among PCI bus 625, processor 600, L2 cache 610, main memory 620, and host bus 605. PCI bus 625 provides an interface for a variety of devices including, for example, LAN card 630. PCI-to-ISA bridge 635 provides bus control to handle transfers between PCI bus 625 and ISA bus 640, universal serial bus (USB) functionality 645, IDE device functionality 650, power management functionality 655, and can include other functional elements not shown, such as a real-time clock (RTC), DMA control, interrupt support, and system management bus support. Peripheral devices and input/output (I/O) devices can be attached to various interfaces 660 (e.g., parallel interface 662, serial interface 664, infrared (IR) interface 666, keyboard interface 668, mouse interface 670, and fixed disk (HDD) 672) coupled to ISA bus 640. Alternatively, many I/O devices can be accommodated by a super I/O controller (not shown) attached to ISA bus 640.

BIOS 680 is coupled to ISA bus 640, and incorporates the necessary processor executable code for a variety of low-level system functions and system boot functions. BIOS 680 can be stored in any computer readable medium, including magnetic storage media, optical storage media, flash memory, random access memory, read only memory, and communications media conveying signals encoding the instructions (e.g., signals from a network). In order to attach computer system 601 to another computer system to copy files over a network, LAN card 630 is coupled to PCI bus 625 and to PCI-to-ISA bridge 635. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of establishing concurrent network connections from a client computer, said method comprising:
   receiving a resource request at the client computer, the resource request corresponding to a first resource in a first security domain from a plurality of security domains;
   in response to the receiving, searching an association table accessible from the client computer, the association table containing a plurality of stored active credentials, wherein each stored active credential includes authorization data needed to access one of the plurality of security domains;
   in response to the searching, determining if an applicable active credential is found in the association table, wherein the applicable active credential corresponds to the first security domain;
   in response to determining that the applicable active credential is found in the association table:
      retrieving the applicable active credential from the association table;
      determining that the retrieved applicable active credential includes a dynamic data field;
      in response to determining that the retrieved applicable active credential includes a dynamic data field, prompting a user for dynamic input based on a dynamic data description;
      storing the dynamic input in the dynamic data field within the retrieved applicable active credential; and
      accessing the requested resource by using the retrieved applicable active credential to connect to a first server, wherein the first server is selected from a plurality of servers and wherein the first server manages the first security domain; and
   in response to determining that the applicable active credential is not found in the association table:
      defining, by the client computer, a new active credential;
      accepting authorization data corresponding to a network connection;
      determining that the authorization data includes dynamic data;
      in response to determining that the authorization data includes dynamic data, storing the new active credential, including the authorization data and the dynamic data description, in the association table; and
      accessing the requested resource by using the new active credential to connect to the first server.

2. The method as described in claim 1 wherein each active credential stored in the association table includes one or more definition fields.

3. The method as described in claim 2 wherein the definition fields are selected from the group consisting of a domain name, a server name, a user id, and a password.

4. An information handling system comprising:
   one or more processors;
   a memory accessible by the processors;
   one or more nonvolatile storage devices accessible by the processors;
   a concurrent network connection tool to execute network connections for a client computing device, the concurrent network connection tool being effective to:
      receive a resource request at the client computing device, the resource request corresponding to a first resource in a first security domain from a plurality of security domains;
      search an association table accessible from the client computing device, the association table containing a plurality of stored active credentials, wherein each stored active credential includes authorization data needed to access one of the plurality of security domains;
      determine if an applicable active credential is found in the association table, wherein the applicable active credential corresponds to the first security domain;
      retrieve the applicable active credential from the association table in response to determining that the applicable active credential is found in the association table;
      determine that the retrieved applicable active credential includes a dynamic data field;
      prompt a user for dynamic input based on a dynamic data description in response to determining that the retrieved applicable active credential includes a dynamic data field;
      store the dynamic input in the dynamic data field within the retrieved applicable active credential;
      access the requested resource by using the retrieved applicable active credential to connect to a first server, wherein the first server is selected from a plurality of servers and wherein the first server manages the first security domain;
      define a new active credential in response to determining that the applicable active credential is not found in the association table;

accept authorization data corresponding to a network connection;

determine that the authorization data includes dynamic data;

store the new active credential, including the authorization data and the dynamic data description, in the association table; and access the requested resource by using the new active credential to connect to the first server in response to defining the new active credential.

5. The information handling system as described in claim 4 wherein each active credential stored in the association table includes one or more definition fields.

6. The information handling system as described in claim 5 wherein the definition fields are selected from the group consisting of a domain name, a server name, a user id, and a password.

7. A computer program product stored in a computer operable media for executing concurrent network connections, said computer program product containing instructions for execution by a client computer, which, when executed by the client computer, cause the client computer to implement a method comprising:

receiving a resource request, the resource request corresponding to a first resource in a first security domain from a plurality of security domains;

in response to the receiving, searching an association table accessible from the client computer, the association table containing a plurality of stored active credentials, wherein each stored active credential includes authorization data needed to access one of the plurality of security domains;

in response to the searching, determining if an applicable active credential is found in the association table, wherein the applicable active credential corresponds to the first security domain;

in response to determining that the applicable active credential is found in the association table:

retrieving the applicable active credential from the association table;

determining that the retrieved applicable active credential includes a dynamic data field;

in resrponse to determining that the retrieved applicable active credential includes a dynamic data field, prompting a user for dynamic input based on a dynamic data description;

storing the dynamic input in the dynamic data field within the retrieved applicable active credential; and accessing the requested resource by using the retrieved applicable active credential to connect to a first server, wherein the first server is selected from a plurality of servers and wherein the first server manages the first security domain; and in response to determining that the applicable active credential is not found in the association table:

defining, by the client computer, a new active credential;

accepting authorization data corresponding to a network connection;

determining that the authorization data includes dynamic data;

in response to determining that the authorization data includes dynamic data, storing the new active credential, including the authorization data and the dynamic data description, in the association table; and accessing the requested resource by using the new active credential to connect to the first server.

8. The computer program product as described in claim 7 wherein each active credential stored in the association table includes one or more definition fields.

9. The computer program product as described in claim 8 wherein the definition fields are selected from the group consisting of a domain name, a server name, a user id, and a password.

10. The method as described in claim 1 further comprising:

in response to prompting the user for dynamic input, receiving, from the user, a pseudo-random authorization code.

11. The method as described in claim 1 further comprising:

in response to prompting the user for dynamic input, receiving a fingerprint scan from the user.

12. The information handling system as described in claim 4 wherein the concurrent network connection tool is further effective to:

receive, from the user, a pseudo-random authorization code in response to prompting the user for dynamic input.

13. The information handling system as described in claim 4 wherein the concurrent network connection tool is further effective to:

receive a fingerprint scan from the user in response to prompting the user for dynamic input.

14. The computer program product as described in claim 7 wherein the method further comprises:

in response to prompting the user for dynamic input, receiving, from the user, a pseudo-random authorization code.

15. The computer program product as described in claim 7 wherein the method further comprises:

in response to prompting the user for dynamic input, receiving a fingerprint scan from the user.

* * * * *